United States Patent
Chen (10) Patent No.: US 8,300,288 B2
(45) Date of Patent: Oct. 30, 2012

(54) COLOR ADJUSTING APPARATUS AND METHOD FOR LIGHT SOURCE

(75) Inventor: Pi-Chen Chen, Taipei (TW)

(73) Assignee: Transpacific Plasma, LLC, Wilmington, DE (US)

( * ) Notice: Subject to any disclaimer, the term of this patent is extended or adjusted under 35 U.S.C. 154(b) by 1483 days.

(21) Appl. No.: 11/835,888

(22) Filed: Aug. 8, 2007

(65) Prior Publication Data

US 2007/0273940 A1 Nov. 29, 2007

Related U.S. Application Data (62) Division of application No. 10/064,559, filed on Jul. 26, 2002, now abandoned.

(30) Foreign Application Priority Data

Mar. 18, 2002 (TW) .............................. 91105037 A (51) Int. Cl.
*H04N 1/46* (2006.01)
(52) U.S. Cl. ........ 358/505; 358/504; 358/509; 358/512; 358/513; 358/514
(58) Field of Classification Search .................. 358/504, 358/509, 512–514, 505; 348/272, 280, 282; 356/425; 359/642
See application file for complete search history.

(56) References Cited

U.S. PATENT DOCUMENTS

| | | | |
|---|---|---|---|
| 3,509,345 A | 4/1970 | Astheimer | |
| 4,383,758 A | 5/1983 | Honda et al. | |
| 4,437,112 A | 3/1984 | Tanaka et al. | |
| 4,691,228 A | 9/1987 | Nagano | |
| 4,698,669 A | 10/1987 | Sekizawa et al. | |
| 4,926,250 A | 5/1990 | Konishi | |
| 4,952,972 A | 8/1990 | Someya | |
| 5,126,856 A | 6/1992 | Abe | |
| 5,241,378 A | 8/1993 | Nishiguchi | |
| 5,282,046 A | 1/1994 | Yamaguchi | |
| 5,495,329 A | 2/1996 | Anderson, II et al. | |
| 5,526,185 A * | 6/1996 | Herloski | 359/642 |
| 5,694,227 A * | 12/1997 | Starkweather | 358/504 |
| 5,910,937 A | 6/1999 | Akiba et al. | |
| 5,920,408 A | 7/1999 | Nagano | |
| 6,043,907 A | 3/2000 | Okino | |
| 6,051,826 A | 4/2000 | Arimoto | |
| 6,188,501 B1 | 2/2001 | Neushul | |
| 6,633,415 B1 | 10/2003 | Arafune | |
| 6,734,993 B1 | 5/2004 | Damm et al. | |
| 6,760,096 B2 | 7/2004 | Kitabayashi et al. | |
| 6,792,161 B1 | 9/2004 | Imaizumi | |

(Continued)

OTHER PUBLICATIONS

U.S. Appl. No. 11/835,859, Mail Date Jul. 27, 2010, Office Action.

(Continued)

*Primary Examiner* — Cheukfan Lee (57) ABSTRACT

Color adjusting apparatus and method for a light source. A reflector of a required color is added to a light source of a scan module, a plating film of the required color is formed on a lens, or the lens is dyed with the required color. Or alternatively, the color of the light source is directly changed into the required color. As a result, the inconsistent intensities for the light in the primary color, red, green and blue output from the charge-coupled device caused by different brightness of the light source, different wavelength transmission of the lens, and different light sensitivity of the charge-coupled device is improved.

25 Claims, 5 Drawing Sheets

U.S. PATENT DOCUMENTS

| | | |
|---|---|---|
| 6,906,830 B1 | 6/2005 | Hayashi |
| 7,023,587 B2 | 4/2006 | Ikeda |
| 7,349,132 B2 | 3/2008 | Ide |
| 7,724,402 B2 | 5/2010 | Ichikawa |
| 7,791,771 B2 | 9/2010 | Shiraishi |
| 7,843,610 B2 | 11/2010 | Hoshi |
| 7,864,383 B2 | 1/2011 | Shiraishi |
| 2006/0077479 A1 | 4/2006 | Itou |
| 2007/0111233 A1 | 5/2007 | Bianchi |
| 2007/0216969 A1 | 9/2007 | Nishina |
| 2007/0229712 A1 | 10/2007 | Uota |
| 2007/0268532 A1 | 11/2007 | Chen |
| 2008/0043295 A1 | 2/2008 | Sakakibara |

OTHER PUBLICATIONS

United States Patent and Trademark Office, Final Office Action, U.S. Appl. No. 11/835,859, mailed Jan. 5, 2011, 9 pages.
United States Patent and Trademark Office, Non-Final Office Action, U.S. Appl. No. 11/835,859, mailed Mar. 23, 2011, 7 pages.
United States Patent and Trademark Office, Notice of Allowance, U.S. Appl. No. 11/835,859, mailed Sep. 22, 2011, 8 pages.

* cited by examiner

COLOR ADJUSTING APPARATUS AND METHOD FOR LIGHT SOURCE

CROSS REFERENCE TO RELATED APPLICATIONS

This application is a second divisional application of commonly assigned application Ser. No. 10/064,559, filed on Jul. 26, 2002 now abandoned, which claims the priority benefit of Taiwan application serial no. 91105037, filed on Mar. 18, 2002.

BACKGROUND OF INVENTION

1. Field of the Invention

The invention relates in general to a color adjusting apparatus and method for a light source. More particularly, the invention relates to a color adjusting apparatus and method of use for a light source of an optical scan module.

2. Related Art of the Invention

As image input, operation and processing have caused popular interest, the scanner becomes a basic accessory for many computer users. Through the scanner, text or graphs in documents, magazines, books or pictures can be scanned and input into a computer for further processing. The platform scanner is the most common type among various kinds of scanners. In the platform scanner, the scan module, installed under a transparent platform, can be pulled back and forth to scan the document on the transparent platform. The scan module itself does not have a driving mechanism, so the driving mechanism such as a motor, gear, and belt are required. While using the platform scanner to scan a document, the document has to be disposed on the transparent platform and covered with a lid, which presses the document down on the transparent platform.

The conventional scan module 700 of an optical scanner (referring to FIG. 1) includes a light source 100, a mirror set 400, a lens set 500 and an optical detector such as charge-coupled device (CCD) 600. While performing a scan, the light source (such as a light tube) 100 radiates on the document 200 disposed on the light transparent board 300 (which is the transparent platform). An imaging light 110 is obtained via reflection (where the light source 100 is located underneath the light transparent board 300) or transmission (where the light source 100 is located over the light transparent board 300). The mirror set 400 is an assembly of multiple mirrors 401, 402, 403 and is located along the optical path of the imaging light 110. The image of the document 200 directed to the mirror set 400 is reflected to the lens set 500 thereby. Through the lens set 500, the imaging light 110 of the document 200 is incident and displayed on the charge-coupled device 600.

Figure 1:
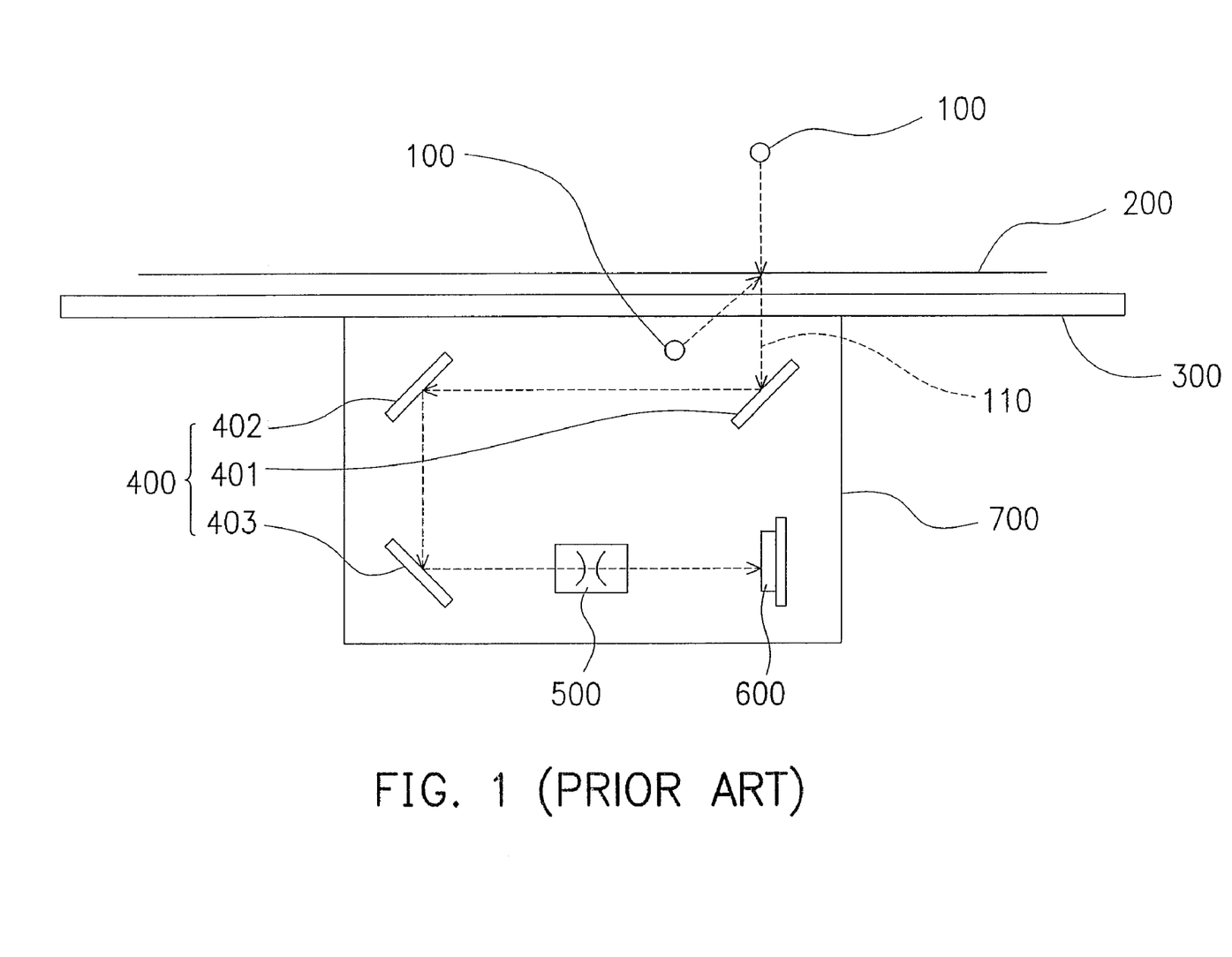
FIG. 1 is a cross-sectional view of a conventional optical scan module.

The light source 100 of the optical scan module 700 is a very important device for the whole optical system. The light emitted by the light source 100 generates various intensities according to the frequency thereof. Through the function of the charge-coupled device 600, for example, after inspection of modulation transfer function (MTF), a certain degree of color deviation often results. Therefore, compensation and correction in a firmware for each scan step is required to obtain the correct color. This is very costly and time consuming.

Figure 2:
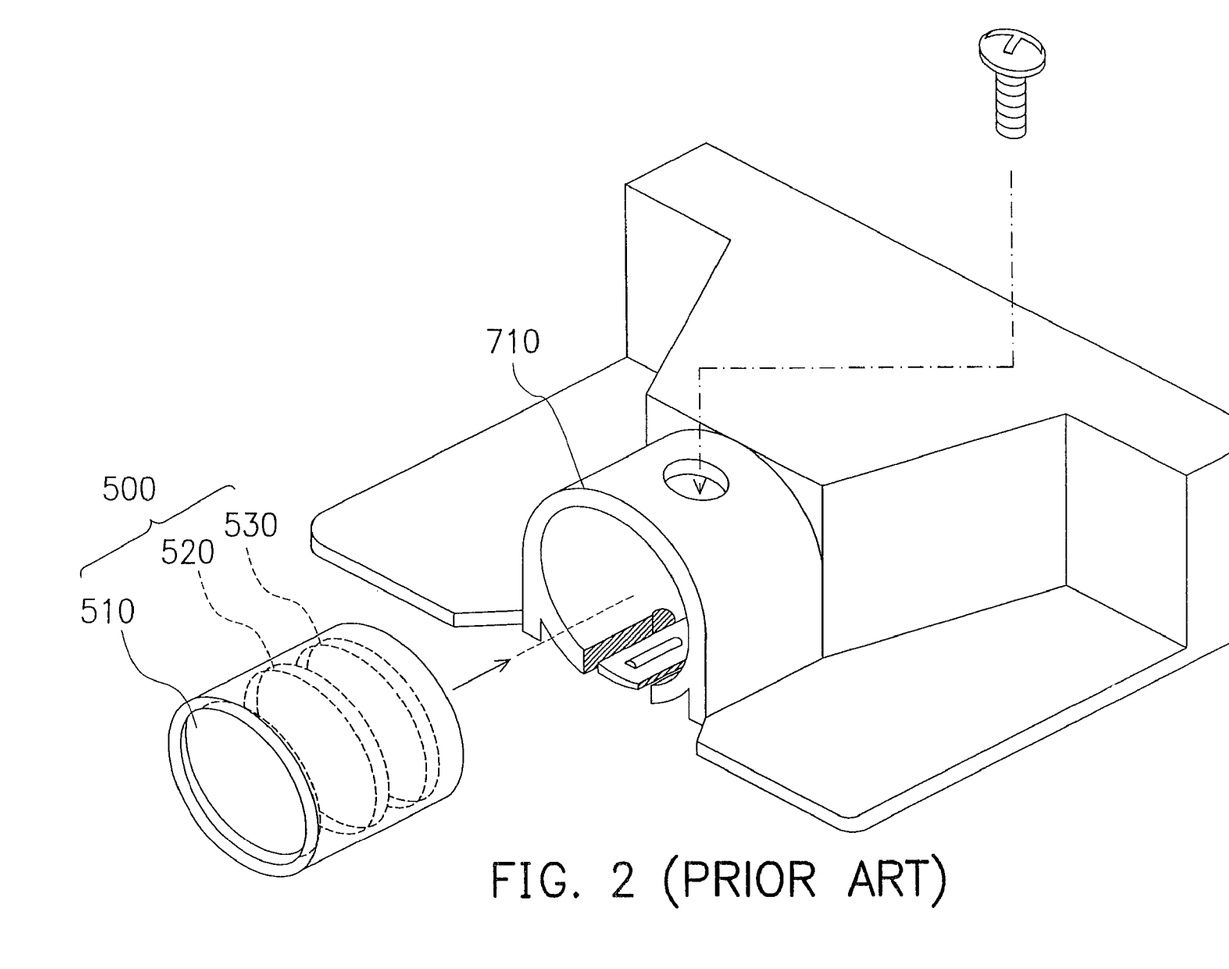
FIG. 2 shows a perspective view of a lens set of a conventional optical scan module.

The function of the lens set 500 is to display the imaging light 100 on the charge-coupled device 600. That is, the light signal collected by the lens set 500 is the material source that all the subsequent devices are processing. Therefore, the correctness of the light signal is crucial. Generally speaking, as shown in FIG. 2, the lens set 500 is a composite signal lens consisting of a plurality of lenses, for example, the lenses 510, 520 and 530 as shown in FIG. 1 and installed in the lens holder 710. Using lenses with different materials or curvatures, the aberration caused by a single lens is corrected. However, as the wavelength transmission for the lenses 510, 520 and 530 is different, inconsistent output intensities in the primary colors red, green and blue of the charge-couple device 600 results.

Further, the charge-coupled device 600 comprises thousands of optoelectronic diodes (pixels) arranged in straight lines. Each optoelectronic diode comprises three detectors to receive the red, green and blue color light signals, respectively. In the scanning operation, the charge-coupled device 600 outputs analog red, green and blue electronic signals for the light received in each sequence. By analog-to-digital conversion, the converted signals are then transmitted to the subsequent devices for processing. The detectors of the charge-coupled device 600 do not detect only one single primary color signal. Therefore, frequency response of mutual interference between color signals occurs. The light sensitivity of the charge-coupled device 600 is degraded due to different light sensitivity generated for different colors, increased scan moving speed of the charge-coupled device 600 and decrease of exposure amount. Accordingly, inconsistent output intensities for red, green and blue light are generated by the charge-coupled device 600.

SUMMARY OF INVENTION

The present invention provides a color adjusting apparatus and method. A reflector with a required color is added to a light source of a scan module. A plating film with the required color is formed on a lens. Or alternatively, the light source is directly switched to the required color. Thus, the inconsistent output intensities for the three primary colors, red, green and blue light, of the charge-coupled device caused by different brightness of the light source, different wavelength transmission of the lens and the different light sensitivities of the charge-coupled device is improved.

The color adjusting method provided by the present invention is applied to an optical scan module. The optical scan module includes at least a light source, a mirror set, a lens set and an optical detector. The light source is used to radiate a document to obtain an imaging light. The mirror set is disposed along an optical path of the imaging light. Thereby, the imaging light is projected to the optical detector. The lens set is located along the optical path between the optical detector and the mirror lens set. The color adjusting method includes the following steps.

A reflector is provided and allocated at an opposing side of the side where the light source radiates the document. The color of the reflector is selected from red, green or blue. Through the reflector, the intensity of the selected color of the light source is enhanced.

Alternatively, a light transparent plating film is formed on a surface of the lens by evaporation plating. The light transparent plating film has a color selected from a group consisting of red, green and blue colors. Therefore, the intensity of the selected color of the light source is enhanced.

The lens may also be dyed to have a specific color selected from a group consisting of red, green and blue colors.

In yet another alternative embodiment, the original light source can be replaced by a color adjusted light source. The color of the adjusted light source can be selected from a group consisting of red, green and blue light sources, such that the intensity of the light source with the selected color is enhanced.

Accordingly, the inconsistent output intensities for the primary colors red, green and blue of the charge-coupled device can be improved.

The present invention further provides a color adjusting apparatus for an optical scan module. The optical scan module comprises at least a light source, a reflection mirror set, a lens set and an optical detector. The light source is used to radiate a document, so as to obtain an imaging light. The reflection mirror set is located at an optical path of the imaging light to direct the imaging light incident onto the optical detector. The lens set is allocated at the optical path between the optical detector and the reflection mirror. The light adjusting apparatus further comprises a reflector, of which the color is selected from a group consisting of red color, green color and blue color.

Alternatively, the color adjusting apparatus further comprises a transparent plating film formed on a surface of the lens set. The color of the transparent plating film is selected from a group consisting of red color, green color and blue color.

The present invention further provides an optical scan module applicable for scanning a document. The optical scan module comprises at least a light source, a reflector, a reflection mirror set, a lens set and an optical detector.

The light source is used to radiate a document, so as to obtain an imaging light. The reflector is allocated at one side opposing the side where the light source radiates the document. The color of the reflector is selected from a group consisting of red color, green color and blue color, such that the intensity of the selected color is increased. The reflection mirror set is located on an optical path of the imaging light to receive and reflect the imaging light. The lens set is allocated along the optical path to allow the imaging light reflected from the reflection mirror set to pass therethrough. The optical detector is allocated along the optical path, so as to receive the imaging light passing through the lens set.

The lens set comprises at least one lens, on which a transparent plating film is formed by evaporation plating. The color of the transparent plating film is selected from a group consisting of red color, green color and blue color.

The lens may also be dyed into a color selected from a group consisting of red, green and blue colors.

Alternatively, the light source may have a color selected from a group consisting of red, green and blue colors.

Accordingly, the present invention uses a reflector, a lens or a light source with a specific color to improve the performance of the light source in such specific color. Therefore, the inconsistent output intensities for any specific colors (such as red, green and blue colors) of the charge-coupled device are improved.

The present invention directly improves the performance of the light source in a specific color, so that the step of compensation and correction following each scan is avoided to reduce fabrication time and cost.

BRIEF DESCRIPTION OF DRAWINGS

These, as well as other features of the present invention, will become more apparent upon reference to the drawings wherein.

DETAILED DESCRIPTION

First Embodiment

Figure 3:
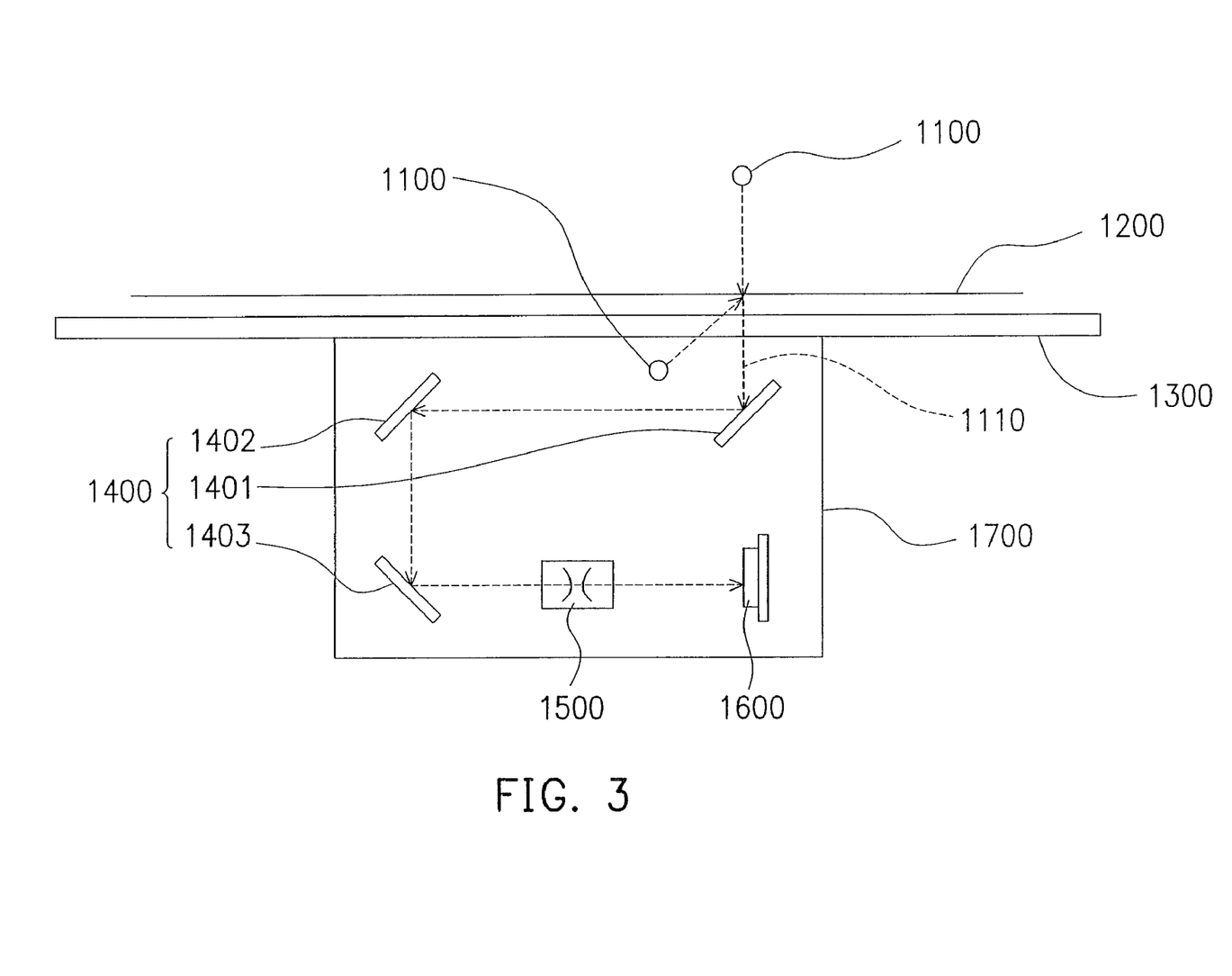
FIG. 3 is a cross-sectional view of an optical scan module according to the present invention.

FIG. 3 shows a cross-sectional view of an optical scan module according to the present invention. The optical scan module 1700 comprises a light source 1100, a reflection mirror set 1400, a lens set 1500 and an optical detector, for example, a charge-coupled device (CCD) 1600. While performing scan, the light source 1100 radiates a document disposed on a transparent board 1300. By reflection (where the light source 1100 is located under the transparent board 1300) or projection (where the light source 1100 is located over the transparent board 1300), an imaging light 1110 is obtained. The reflection mirror set 1400 is assembled by reflection mirrors 1401, 1402 and 1403 located on an optical path of the imaging light 1110, such that the imaging light 1110 is directed to the reflection mirror set 1400. The imaging light 1110 is then reflected from the reflection mirror set 1400 and transmitted to the lens set 1500. The lens set 1500 receives and displays the imaging light 1116 of the document 1200 reflected from the reflection mirror set 1400 on the charge-coupled device 1600.

Figure 4A:
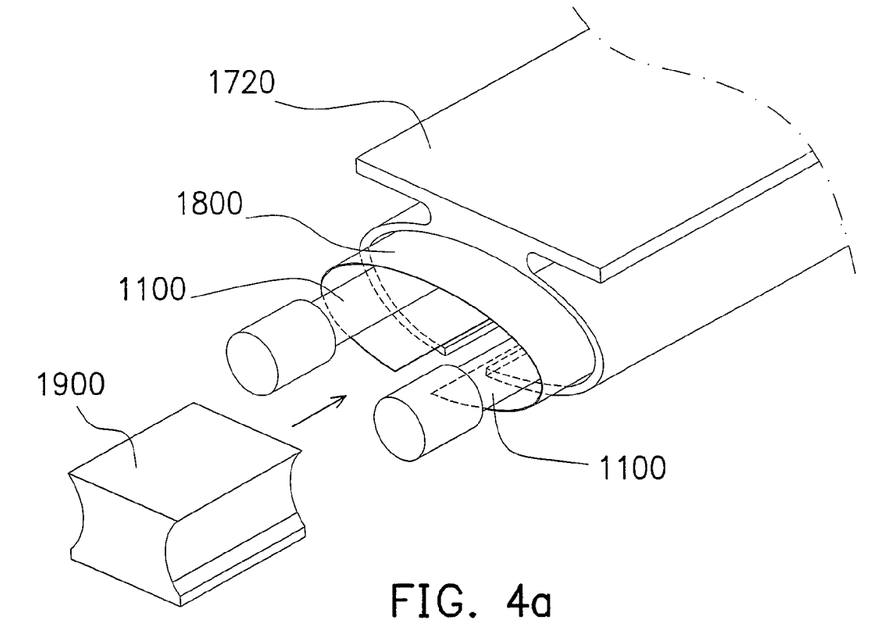
FIGS. 4a and 4b show the respective and side view of a light source of an optical scan module in one embodiment of the present invention.
Figure 4B:
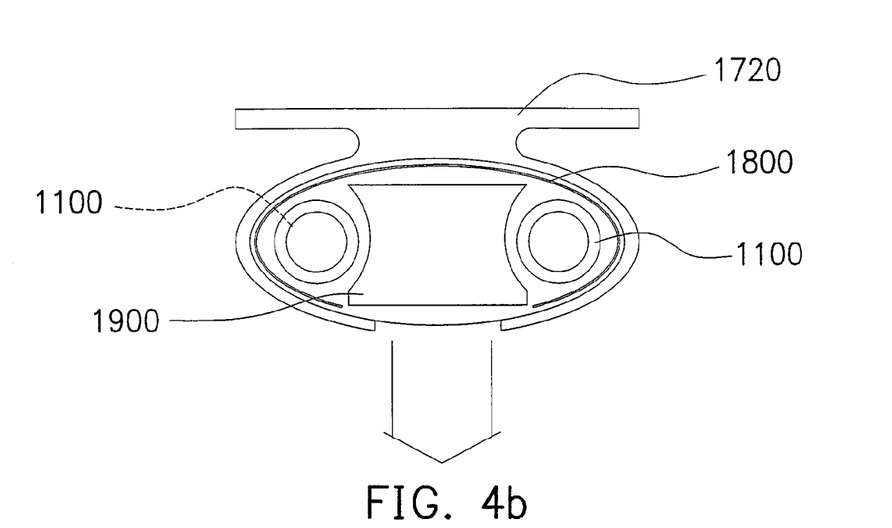

Referring to FIGS. 4a and 4b, the respective schematic drawing and the side view of the light source of the optical scan module provided by the present invention is shown. The light source 1100 includes at least one lamp tube (two lamp tubes as shown in FIGS. 4a and 4b), for example. The light source 1100 is mounted in the lamp base 1720 of the optical scan module 1700. The method of mounting the lamp tubes 1100 includes inserting a rubber plug 1900 at two sides of the lamp base 1720. To increase the intensity of the light source 1100, a reflector 1800 is allocated at a side opposing to the side where the document 1200 is radiated by the light source 1100. The light intensity of the light source 1100 is thus enhanced by reflection.

To improve the inconsistent intensities of the red, green and blue color light output of the charge-coupled device 1600, a reflector 1800 with a specific color is incorporated. For example, when red light is found to have insufficient intensity, a red reflector 1800 is used to enhance the output performance of red light. Similarly, when the intensity of the green light is insufficient, the reflector 1800 with green color is used to enhance the output performance of green light. If the intensity of the blue light is found insufficient, a blue reflector 1800 is applied to enhance the output performance of blue light. The intensity or brightness of the color is determined and adjusted by testing result.

In addition to generating reflected light in the specific color by the reflector 1800, the method for enhancing the performance of the specific color of the light source 1100 further comprises directly using a light source with such specific color. That is, if the red light output intensity of the charge-coupled device 1600 is found insufficient after a test, a red light source 1100 is used for compensating such insufficiency. If the green light output intensity of the charge-coupled device 1600 is insufficient, a green light source 1100 is used.

Similarly, when the blue light output intensity is insufficient, a blue light source 1100 is used.

Second Embodiment

Figure 5:
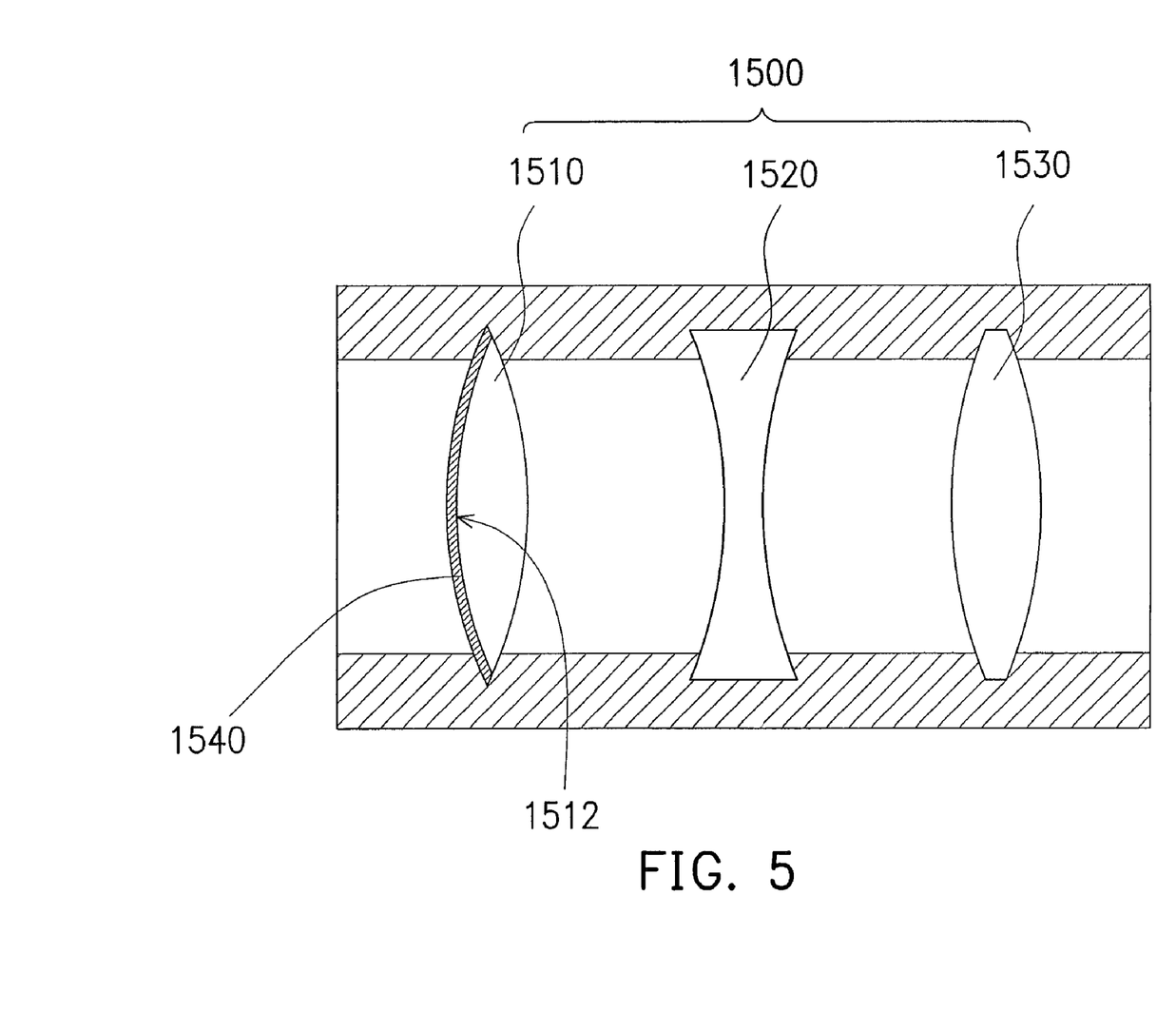
FIG. 5 is a side view showing a lens set of an optical scan module in a second embodiment of the present invention.

Referring to FIG. 5, a side view of a lens set of an optical scan module in a second embodiment of the present invention is shown. Similarly, the lens set 1500 includes a single lens format assembled by multiple lenses (1510, 1520 and 1530 in this embodiment). To improve the inconsistent intensities for red, green and blue lights, a surface 1512 of the lens 1510 is coated with a transparent plating film 1540 with a specific color. The method for forming the transparent plating film 1540 includes evaporation plating.

For example, when it is found that the charge-coupled device 1600 has insufficient intensity for red light, a red transparent plating film 1540 is formed to enhance the red light output performance of the light source. When the green light intensity output from the charge-coupled device 1600 is insufficient, a green transparent plating film 1540 is formed. When the blue light intensity of the charge-coupled device 1600 is insufficient, a blue transparent plating film 1540 is formed.

In addition to the plating film, the lens 1510 can also be dyed into the specific color to enhance output performance of the specific color of the light source 1100. If the output of red light of the charge-coupled device 1600 is insufficient, the lens 1510 is dyed into red color. The output performance of red light for the charge-coupled device 1600 can thus be enhanced. If the output of green light of the charge-coupled device 1600 is insufficient, the lens 1510 is dyed with green color, and when the output of blue light of the charge-coupled device is insufficient, the lens 1510 is dyed with blue color.

The above embodiment only incorporates a plating film on one surface of one lens, or dyes one lens. According to specific requirement, the plating film can be formed on a part of the surface, or the whole surface, of the lens. Further, plating films may also be formed on other lenses, or other lenses can also be dyed.

According to the above embodiment, the light source, reflector and lens set are modified to improve the inconsistent intensities of red, green and blue lights. In the above embodiments, three primary lights are used to explain the present invention. It is appreciated that the present invention may also be applied to compensation and correction of other colors for the light source.

The present thus has at least the following advantages:

(1) A reflector or a lens in a specific color, or a light source with this specific color is used to improve the performance of light in this specific color. Therefore, the inconsistence in intensity for light in different colors output from the charge-coupled device is improved.

(2) The performance of the light source in specific color is directly improved. Therefore, the compensation and correction step performed in the firmware after each scan is avoided to save time and cost.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

The invention claimed is:

1. A method comprising:
    providing a document scanner having a light source configured to radiate a document to produce an imaging light, a reflection mirror set in an optical path of the imaging light and configured to reflect the imaging light, an optical detector configured to receive the imaging light reflected by the reflection mirror set, and a lens set comprising at least one lens disposed in the optical path between the optical detector and the reflection mirror set;
    detecting a portion of the imaging light having insufficient intensity outputted by the optical detector;
    configuring the at least one lens with a color effective to enhance the intensity of the portion of the imaging light detected to have insufficient intensity; and
    passing the imaging light through the at least one lens of the lens set.

2. The method according to claim 1, further comprising forming a transparent plating film on a surface of the at least one lens, a color of the transparent plating film being selected from a group consisting of red, green, and blue colors.

3. The method of claim 1, further comprising dyeing the at least one lens with a specific color selected from a group consisting of red, green and blue colors.

4. The method of claim 1, further comprising forming a transparent plating film on a portion of a surface of the at least one lens, a color of the transparent plating film being selected from a group consisting of red, green, and blue colors.

5. The method of claim 1, wherein the at least one lens has a color selected from a group consisting of red, green and blue colors.

6. An optical scan module, comprising:
    a light source configured to radiate a document to obtain an imaging light;
    a reflection mirror set disposed in an optical path of the imaging light and configured to reflect the imaging light;
    a lens set disposed in the optical path of the imaging light and configured to allow imaging light reflected from the reflection mirror set to pass therethrough, the lens set comprising at least one lens; and
    an optical detector disposed in the optical path of the imaging light and configured to receive the imaging light that passes through the lens set,
    wherein responsive to a determination that an output of the optical detector indicates that a portion of the imaging light has an insufficient intensity, the at least one lens is configured with a color, selected from a group consisting of red, green, and blue colors, to enhance the intensity of the portion of light having the insufficient intensity.

7. The optical scan module of claim 6, wherein the at least one lens has a transparent plating film formed on a surface thereof, the transparent plating film having the selected color.

8. The optical scan module of claim 6, wherein the at least one lens has a transparent plating film formed on a portion of a surface thereof, the transparent plating film having the selected color.

9. An optical scan module, comprising:
    means for radiating a document to obtain an imaging light that includes light having a first color and an insufficient intensity;
    means for reflecting the imaging-light disposed in an optical path of the imaging light;
    means for allowing the imaging light reflected by the means for reflecting to pass therethrough, the means for allowing disposed in the optical path of the imaging light and comprising at least one lens having a color, selected from a group consisting of red, green, and blue colors, to enhance the intensity of the light of the imaging light having the first color; and means for receiving the imaging light that passes through the means for allowing, the means for receiving disposed in the optical path of the imaging light.

10. The optical scan module of claim 9, wherein the means for radiating comprises a light source.

11. The optical scan module of claim 9, wherein the means for reflecting comprises a reflection mirror set.

12. The optical scan module of claim 9, wherein the means for allowing comprises a lens set and the at least one lens has a transparent plating film formed on a surface thereof, the transparent plating film having the selected color.

13. The optical scan module of claim 9, wherein the means for allowing comprises a lens set and the at least one lens has a transparent plating film formed on a portion of a surface thereof, the transparent plating film having the selected color.

14. The optical scan module of claim 9, wherein the means for receiving comprises an optical detector.

15. A scanner, comprising:
a platform configured to receive a document;
an optical scan module having:
    a light source configured to radiate the document to obtain an imaging light;
    a reflection mirror set, disposed in an optical path of the imaging light and configured to reflect the imaging light;
    a lens set disposed in the optical path of the imaging light and configured to allow light reflected from the reflection mirror set to pass therethrough, the lens set comprising at least one lens having a color selected from a group consisting of red, green, and blue colors; and
    an optical detector disposed in the optical path of the imaging light and configured to receive the imaging light that passes through the lens set,
    wherein the selected color is selected, in response to a determination that the imaging light includes a portion with insufficient intensity, to enhance the intensity of the portion of the imaging light with insufficient intensity; and
a driving mechanism configured to drive the optical scan module along the platform to scan the document.

16. The scanner of claim 15, wherein the at least one lens has a transparent plating film formed on a surface thereof, the transparent plating film having the selected color.

17. The scanner of claim 15, wherein the at least one lens has a transparent plating film formed on a portion of a surface thereof, the transparent plating film having the selected color.

18. A color adjusting method for a scanner light source, comprising:
detecting a portion of imaging light having insufficient intensity outputted by an optical detector of an optical scan module, the optical scan module comprising at least a light source, and the optical detector, wherein the light source is configured to radiate a document to obtain the imaging light at the optical detector; and
passing the imaging light through at least one lens prior to obtaining the imaging light at the optical detector, the at least one lens being disposed in the optical path between the optical detector and the light source, the at least one lens having a color effective to enhance intensity of the color detected to have insufficient output intensity.

19. The method of claim 18, further comprising forming a transparent plating film on a surface of the at least one lens such that the at least one lens has the color effective to enhance intensity of the color detected to have insufficient output intensity.

20. The method of claim 18, further comprising dyeing the at least one lens with a specific color such that the at least one lens has the color effective to enhance intensity of the color detected to have insufficient output intensity.

21. A scan module, comprising:
means for radiating a document to obtain an imaging light;
means for receiving the imaging light; and
means for allowing the imaging light to pass therethrough, the means for allowing the imaging light to pass therethrough disposed in an optical path of the imaging light and comprising at least one lens having a color effective to enhance an intensity of the imaging light for a first color of the imaging light prior to the imaging light being received by the means for receiving the imaging light,
wherein the color of the at least one lens is selected in response to a determination that an output of the means for receiving the imaging light indicates that a portion of the imaging light has an insufficient intensity.

22. The scan module of claim 21, wherein the means for radiating a document comprises a light source.

23. The scan module of claim 21, wherein the means for receiving the imaging light comprises an optical detector.

24. The scan module of claim 21, wherein the means for allowing the imaging light to pass therethrough comprises a lens set and the at least one lens has a transparent plating film formed on a surface thereof, the transparent plating film providing the at least one lens with the color effective to enhance the intensity of the first color.

25. The scan module of claim 21, wherein the means for allowing the imaging light to pass therethrough comprises a lens set and the at least one lens has a dye incorporated therein, the dye providing the at least one lens with the color effective to enhance the intensity of the first color.

\* \* \* \* \*

UNITED STATES PATENT AND TRADEMARK OFFICE
CERTIFICATE OF CORRECTION

PATENT NO. : 8,300,288 B2
APPLICATION NO. : 11/835888
DATED : October 30, 2012
INVENTOR(S) : Chen Page 1 of 1

It is certified that error appears in the above-identified patent and that said Letters Patent is hereby corrected as shown below:

In Column 2, Line 10, delete "charge-couple" and insert -- charge-coupled --, therefor.

In Column 4, Line 30, delete "imaging light 1116" and insert -- imaging light 1110 --, therefor.

Signed and Sealed this
Second Day of April, 2013

Teresa Stanek Rea
*Acting Director of the United States Patent and Trademark Office*